US008640413B2

(12) United States Patent
Ruggie et al.

(10) Patent No.: US 8,640,413 B2

(45) Date of Patent: Feb. 4, 2014

(54) LASER-MARKED MULTI-COMPONENT ASSEMBLIES, KITS, AND RELATED METHODS

(75) Inventors: Mark Ruggie, Franklin Park, IL (US); Henry Coghlan, Elburn, IL (US); Hallie Heuser, Geneva, IL (US); Chase Carter, Joliet, IL (US)

(73) Assignee: Masonite Corporation, Tampa, FL (US)

( * ) Notice: Subject to any disclaimer, the term of this patent is extended or adjusted under 35 U.S.C. 154(b) by 585 days.

(21) Appl. No.: 12/540,708

(22) Filed: Aug. 13, 2009

(65) Prior Publication Data

US 2010/0043314 A1 Feb. 25, 2010

Related U.S. Application Data

(60) Provisional application No. 61/090,796, filed on Aug. 21, 2008.

(51) Int. Cl.

*E04F 13/00* (2006.01)
*B23K 26/00* (2006.01)
*B27H 1/00* (2006.01)
*C03C 15/00* (2006.01)

(52) U.S. Cl.

USPC ..................... 52/311.2; 219/121.85; 144/358; 216/94

(58) Field of Classification Search

USPC ................. 52/311.1, 311.2, 105; 219/121.68, 219/121.85; 144/358, 372; 216/94, 87; 427/596; 264/400; 358/3.29, 3.32

See application file for complete search history.

(56) References Cited

U.S. PATENT DOCUMENTS

| | | | | |
|---|---|---|---|---|
| 3,720,784 A | | 3/1973 | Maydan et al. | |
| 3,789,421 A | | 1/1974 | Chivian et al. | |
| 4,024,545 A | | 5/1977 | Dowling et al. | |
| 4,629,858 A | | 12/1986 | Kyle | |
| 4,847,184 A | | 7/1989 | Taniguchi et al. | |
| 4,861,620 A | | 8/1989 | Azuma | |
| 4,897,944 A | * | 2/1990 | Otake et al. | 40/704 |
| 4,947,022 A | | 8/1990 | Ostroff et al. | |
| 5,017,423 A | | 5/1991 | Bossmann et al. | |
| 5,075,195 A | | 12/1991 | Baebler et al. | |
| 5,171,450 A | | 12/1992 | Hoots | |
| 5,171,650 A | | 12/1992 | Ellis et al. | |

(Continued)

FOREIGN PATENT DOCUMENTS

| | | |
|---|---|---|
| DE | 3916126 | 11/1990 |
| DE | 203 04 528 U1 | 6/2003 |

(Continued)

*Primary Examiner* — Ryan Kwiecinski

(74) *Attorney, Agent, or Firm* — Berenato & White, LLC

(57) ABSTRACT

A method is provided of laser marking a graphic design in an unassembled multi-component structure. A graphic design to be laser marked in a multi-component structure is partitioned into a plurality of graphic design sections, with each of the graphic design sections being assigned to a corresponding component of the multi-component structure. The graphic design sections are laser marked in their corresponding components of the multi-component structure while the multi-component structure is in an unassembled state. The laser-marked components are adapted for assembly together into an assembled state in which the multi-component structure has a viewable expansive surface with the graphic design sections collectively simulating an overall appearance of a graphic design spanning across the corresponding components of the multi-component structure. A kit for assembling laser-marked components into a multi-component structure is also provided.

21 Claims, 7 Drawing Sheets

(56) References Cited

U.S. PATENT DOCUMENTS

| | | | | |
|---|---|---|---|---|
| 5,185,511 | A | 2/1993 | Yabu | |
| 5,200,592 | A | 4/1993 | Yabu | |
| 5,567,207 | A | 10/1996 | Lockman et al. | |
| 5,655,589 | A * | 8/1997 | Vartanian | 160/166.1 |
| 5,990,444 | A | 11/1999 | Costin | |
| 6,140,602 | A | 10/2000 | Costin | |
| 6,170,163 | B1 * | 1/2001 | Bordignon et al. | 33/16 |
| D440,096 | S * | 4/2001 | Railing | D6/577 |
| 6,252,196 | B1 | 6/2001 | Costin et al. | |
| 6,315,202 | B2 | 11/2001 | Costin et al. | |
| 6,495,237 | B1 | 12/2002 | Costin | |
| 6,576,862 | B1 * | 6/2003 | Costin et al. | 219/121.6 |
| 6,664,505 | B2 | 12/2003 | Martin | |
| 6,685,868 | B2 | 2/2004 | Costin | |
| 6,753,501 | B1 | 6/2004 | Costin et al. | |
| 6,807,456 | B1 | 10/2004 | Costin et al. | |
| 6,819,972 | B1 | 11/2004 | Martin et al. | |
| 6,858,815 | B1 | 2/2005 | Costin | |
| 7,003,364 | B1 * | 2/2006 | Hansson et al. | 700/98 |
| 7,100,341 | B2 * | 9/2006 | McIlvaine | 52/745.2 |
| 7,699,896 | B1 | 4/2010 | Colwell | |
| 2003/0066574 | A1 * | 4/2003 | Lovchik et al. | 144/382 |
| 2003/0167717 | A1 * | 9/2003 | Garcia | 52/316 |
| 2004/0045240 | A1 * | 3/2004 | McIlvaine | 52/311.2 |
| 2005/0045594 | A1 * | 3/2005 | Crouse et al. | 216/94 |
| 2005/0076591 | A1 * | 4/2005 | Koeller | 52/311.1 |
| 2007/0035777 | A1 * | 2/2007 | Kintner | 358/3.29 |
| 2007/0108170 | A1 * | 5/2007 | Costin et al. | 219/121.85 |
| 2009/0019801 | A1 * | 1/2009 | Coghlan et al. | 52/311.1 |
| 2009/0071941 | A1 * | 3/2009 | Knoblauch et al. | 216/94 |
| 2011/0049766 | A1 * | 3/2011 | Del Mundo et al. | 264/400 |

FOREIGN PATENT DOCUMENTS

| | | | |
|---|---|---|---|
| FR | 2 779 992 | A1 | 12/1999 |
| GB | 2 189 367 | A | 10/1987 |
| GB | 2294656 | | 5/1996 |
| JP | 1-95885 | | 4/1989 |
| JP | 3-45578 | | 2/1991 |
| JP | 5-138374 | | 6/1993 |
| WO | 93/22944 | | 11/1993 |
| WO | WO 2006/086446 | A2 | 8/2009 |

* cited by examiner

LASER-MARKED MULTI-COMPONENT ASSEMBLIES, KITS, AND RELATED METHODS

CROSS-REFERENCE TO RELATED APPLICATION AND CLAIM OF PRIORITY

This application claims the benefit of priority under 35 U.S.C. §119(e) to U.S. Provisional Patent Application No. 61/090,796 filed Aug. 21, 2008 entitled "Laser-Marked Multi-Component Assemblies, Kits, and Related Methods," the complete disclosure of which is incorporated herein by reference.

FIELD OF THE INVENTION

The present invention relates to laser-marked multi-component assemblies, laser-marked components, component assembly kits, and methods of laser-marking and assembling the components to form laser-marked multi-component assemblies such as building structures.

BACKGROUND OF THE INVENTION

Large assemblies such as building structures often present expansive viewable surface areas that may serve as a canvas for application of a graphic design. Graphic designs include patterns, non-patterns, discrete graphic elements, and the like. These graphic designs can be applied to an assembly such as a building structure (e.g., floors, doors, and walls) and non-building structure for creating an ornamental design appearance or providing instructional or other information on the surface. Painting and engraving are just a few examples of techniques that may be employed to apply a graphic design to a large assembly. Engraving may involve carving, cutting, or etching the surface of the assembly components to permanently remove surface area material of the components. Laser etching is particularly useful for creating intricate and high quality finish graphic designs.

One of the difficulties involved in laser marking a graphic design on a multi-component structure post-assembly is that laser marking equipment is typically not capable of handling and marking over the large expansive surface of an assembled multi-component structure, such as floor and wall surfaces. Poor efficiency is another difficulty that arises when attempting to laser mark the expansive surface of an assembled multi-component structure. Still another difficulty involved in laser making an expansive surface of an assembled multi-component structure is difficulty in compensating for seams or spacing between components, such as in the case of seams between adjacent wall panels or spacing between deck planks.

SUMMARY OF THE INVENTION

A first aspect of the invention provides a method of laser marking a graphic design in an unassembled multi-component structure. According to this aspect, a graphic design to be laser marked in a multi-component structure is partitioned into a plurality of graphic design sections, with each of the graphic design sections being assigned to a corresponding component of the multi-component structure. The graphic design sections are laser marked in their corresponding components of the multi-component structure while the multi-component structure is in an unassembled state. The laser-marked components are adapted for assembly together into an assembled state in which the multi-component structure has a viewable expansive surface with the graphic design sections collectively simulating an overall appearance of a graphic design spanning across the corresponding components of the multi-component structure.

According to a second aspect of the invention, a method of laser marking a graphic design in components of an unassembled multi-component structure and assembling the components into the multi-component structure is provided. According to this aspect, a graphic design to be laser marked in a multi-component structure is partitioned into a plurality of graphic design sections, with each of the graphic design sections being assigned to a corresponding component of the multi-component structure. The graphic design sections are laser marked in their corresponding components of the multi-component structure while the multi-component structure is in an unassembled state. The laser-marked components are assembled together into an assembled state in which the multi-component structure has a viewable expansive surface with the graphic design sections collectively simulating an overall appearance of a graphic design spanning across the corresponding components of the multi-component structure.

A third aspect of the invention provides a construction kit for a multi-component structure. The kit includes a plurality of components of the multi-component structure in an unassembled state, the components being adapted to be assembled together in an assembled state to collectively establish a viewable expansive surface. Laser-marked graphic design sections are each laser marked in a corresponding component of the plurality of components in the unassembled state. When the components of the kit are assembled into the assembled state, the graphic design sections of the laser-marked components collectively simulate on the viewable expansive surface an overall appearance of the graphic design spanning across the corresponding components.

These and other aspects of the invention, including apparatus, systems, methods, articles, structures, kits, and the like which constitute part of the invention, will become more apparent upon reading the following detailed description of the exemplary embodiments and viewing the drawings.

BRIEF DESCRIPTION OF THE DRAWING(S)

The accompanying drawings are incorporated in and constitute a part of the specification. The drawings, together with the general description given above and the detailed description of the preferred embodiments and methods given below, serve to explain the principles of the invention. In such drawings.

Figure 7:
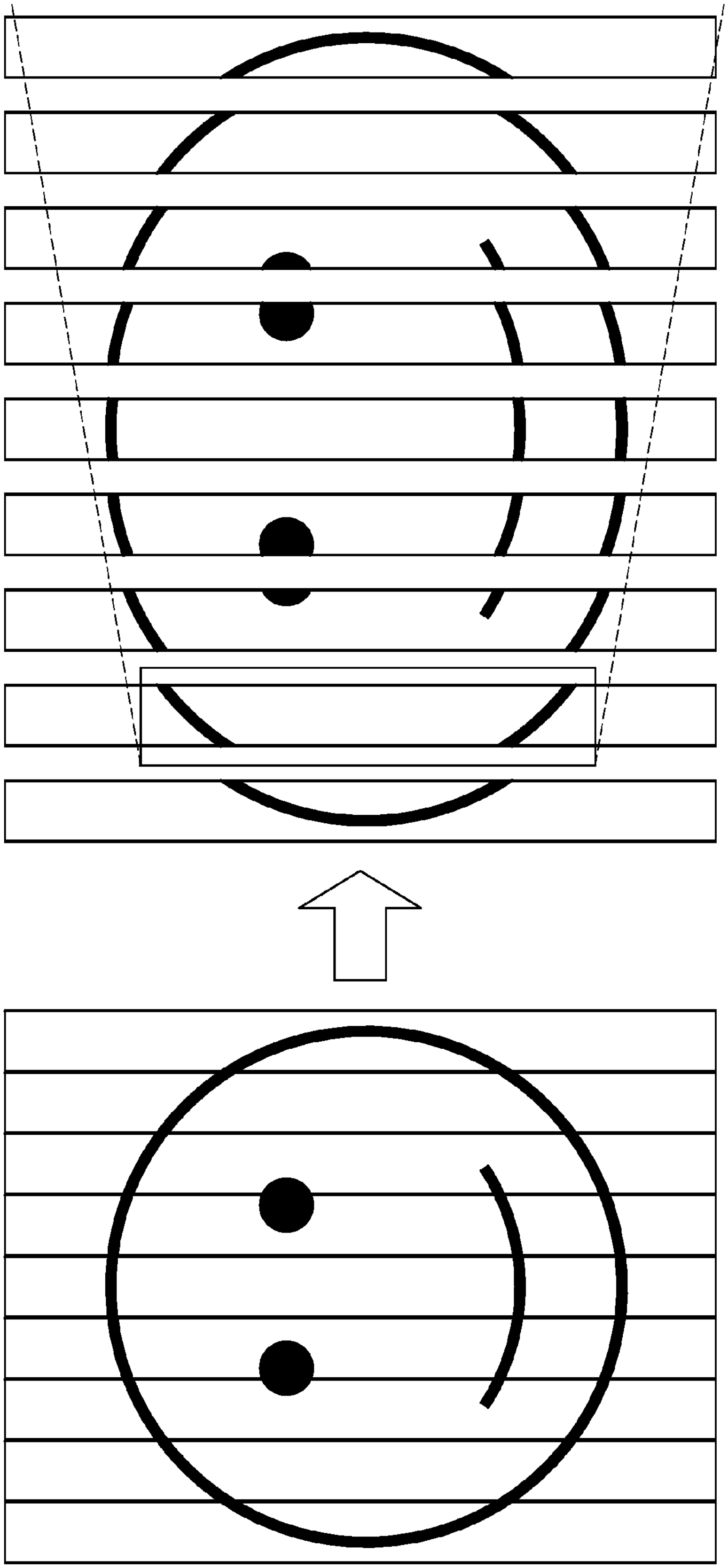
Figure 8:
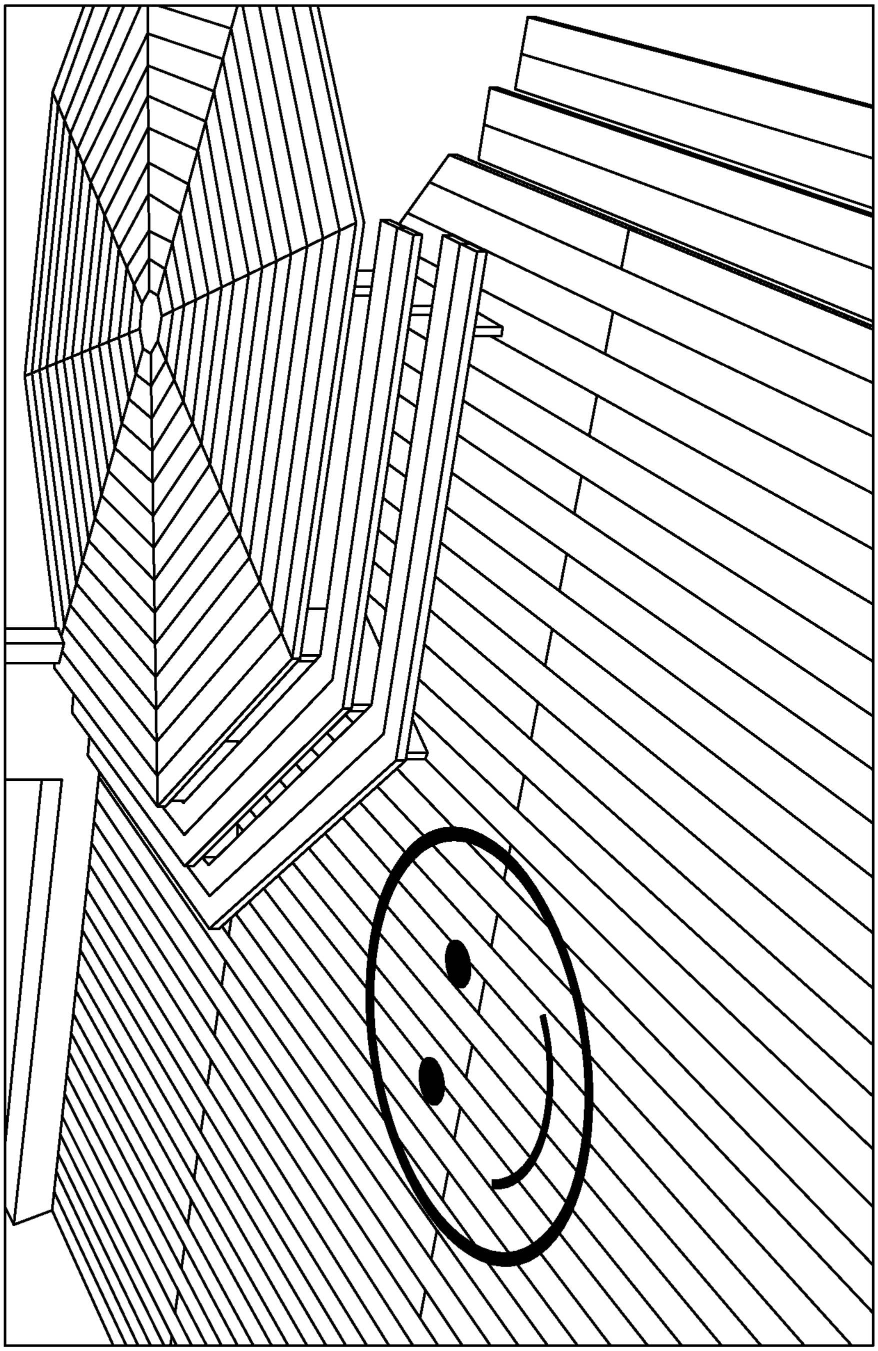

FIG. 7 includes overhead views of a composite deck building assembled structure having a character as a graphic design laser marked into its viewable surface, showing the building assembled structure in assembled and exploded states; and FIG. 8 is a perspective view of a composite deck building assembled structure having the graphic design of FIG. 7.

DETAILED DESCRIPTION OF EXEMPLARY EMBODIMENTS AND EXEMPLARY METHODS OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the exemplary embodiments and methods. The invention according to its various aspects is particularly pointed out and distinctly claimed in the attached claims read in view of this specification, and appropriate equivalents.

The term "laser mark" used herein means to irradiate a component, such as a PVC-wood composite, with a laser beam to form a graphic design. In the course of marking, the laser beam causes a visually perceptible change to the component surface. The change may involve removal, ablation, etching, engraving, or change of color of a coating or the body of the component. The result is a visually-perceptible graphic mark in the component. As used herein, "in the component" includes laser marking the surface of the component without necessarily engraving into the surface.

The terms graphic and graphic design include decorative and artistic designs, non-decorative designs, patterns, graphic images, wood grain, alpha-numeric characters, corporate and trade logos, other identification.

The term "components" as used herein includes but is not necessarily limited to building components. Building components include, for example and not necessarily by limitation, flooring, decking, wall panels, door panels, door trim, siding, cabinetry, railings, etc. for residential and commercial buildings. For explanatory purposes, exemplary embodiments below are described in relation to building components and assembled building structures. It should be understood that the methods and systems described herein and the following exemplary embodiments may be used for marking components other than building components, such as furniture, automotive and packaging components.

Examples of materials that may be treated using the systems and methods embodied herein include glass (tempered glass and/or annealed glass), stone, ceramic, granite, engineered wood, laminates, metal, plastic, gypsum, fiberglass reinforced plastic, wood composites, vinyl, acrylic, polyvinylchloride, hardboard, veneer, low profile carpet tiles, fabrics, paper, etc. For example, U.S. Pat. Nos. 5,486,553 and 5,539,027, both entitled "Advanced Polymer/Wood Composite Structural Member" to Deaner et al. disclose a polymer-wood composite that may be selected for the components. The component members are formed from a composite containing, for example, 30 to 50 wt % of sawdust along with 50 to 70 wt % of a polyvinylchloride (PVC) polymer.

Figure 3:
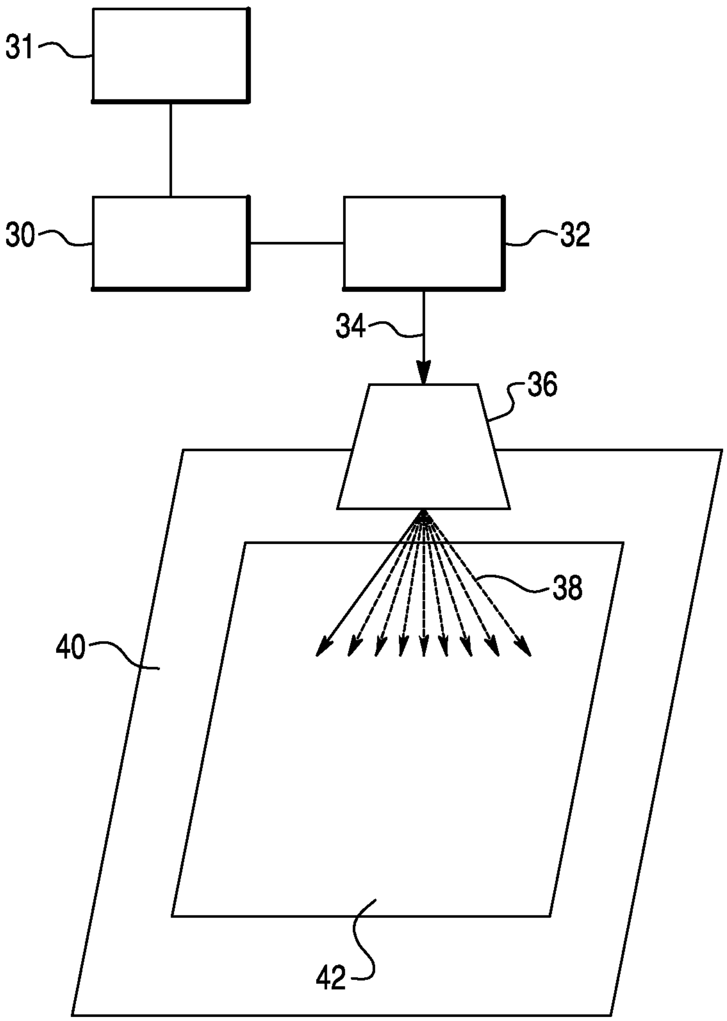
FIG. 3 is a schematic view of a system for forming a mark in the surface of a component according to an embodiment of the invention.

A system for marking components such as building structure components using a high-speed, high-power laser is shown in FIG. 3. The high-power laser is represented by reference numeral 32 in FIG. 3. The output 34 of the laser 32 is coupled to a scanning head 36, which includes a controllable, movable relatively light weight coated mirror that is capable of scanning the laser output at a relatively high speed. The laser output 38 can be scanned across the work piece 42 on working surface 40, such as a table. Work piece 42 may be a building component or other substrate.

The system includes a controller, designated by reference numeral 30 in FIG. 3. Control information for controlling the laser may be stored in advance in the controller 30. The stored control information may be linked to one or many different graphics, e.g., patterns. The controller 30 is capable of keeping up with the high scan speeds produced by the lightweight mirrors and making the necessary power changes at the specified speed. To create fine resolution graphics, the controller makes those power changes at high rates, such as every few millimeters of beam scan. The scan speed of the laser will determine the amount of power changes within the graphic. The type (e.g., complexity and intricacy) and depth of the graphic will also influence how the graphic is marked in the work piece.

Figure 4:
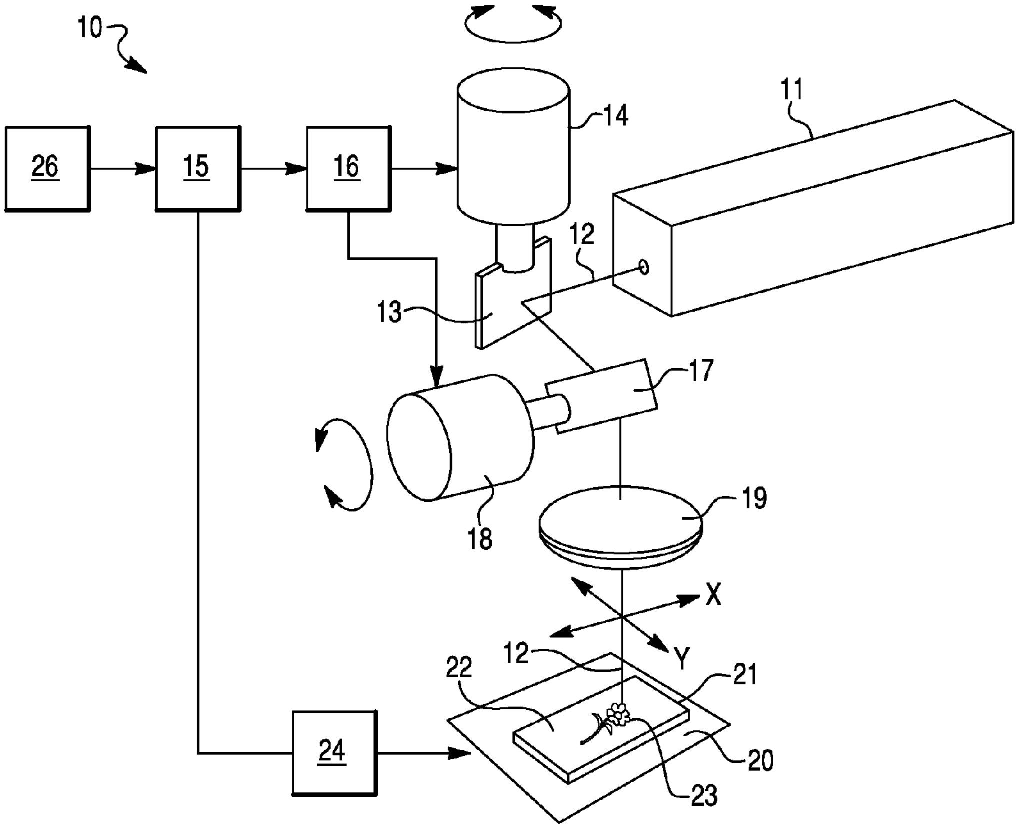
FIG. 4 is a schematic view of a system for forming a mark in the surface of a component according to another embodiment of the invention.

FIG. 4 illustrates another embodiment of a system for marking work pieces, such as building components. The system, generally designated by reference numeral 10, includes a laser 11 for generating a laser beam 12 in a direction of a computer-controlled mirror system. The illustrated mirror system also includes an x-axis mirror 13 rotatably mounted on and driven by an x-axis galvanometer 14. The x-axis galvanometer 14 is adapted to rotate and cause the rotation of the x-axis mirror 13. Rotation of the x-axis mirror 13 while the laser beam 12 is incident on the mirror 13 causes the laser beam 12 to move along the x-axis. A (numerical) control computer 15 controls the output of a power source 16 to control the x-axis galvanometer's 14 rotation of the x-axis mirror 13. The laser beam 12 is deflected by the x-axis mirror 13 and directed toward a y-axis mirror 17 rotatably mounted on y-axis galvanometer 18. The y-axis galvanometer 18, which is also powered by the power source 16, is adapted to rotate and cause rotation of the y-axis mirror 17. Rotation of the y-axis mirror 17 causes movement of the laser beam 12 incident on mirror 17 along the y-axis. The control computer 15 controls the output of the power source 16 delivered to the y-axis galvanometer 18 for controlling rotation of the y-axis galvanometer 18 and the mirror 17.

The laser beam 12 is deflected by the y-axis mirror 17 and directed through a focusing lens 19 adapted to focus the laser beam 12. The lens 19 may be a multi-element flat-field focusing lens assembly, which optically maintains the focused spot on a flat plane as the laser beam 12 moves across a work piece/component 21 to laser mark a graphic. The lens 19, the mirrors 13, 17 and the galvanometers 14, 18 can be housed in a galvanometer block (not shown).

The apparatus 10 further includes a working surface 20 which can be a solid support such as a table, or even a fluidized bed. The work piece (such as a building component) 21 is placed on the working surface 20. The work piece 21 includes a viewable, laser-markable surface 22 to be laser marked. The working surface 20 can be adjusted vertically to adjust the distance from the lens 19 to the laser-markable surface 22 of the work piece 21. The laser beam 12 is directed by the mirrors 13, 17 against the laser-markable surface 22 of the work piece 21. Usually the laser beam 12 is directed generally perpendicular to the laser-markable surface 22, but different graphics can be achieved by adjusting the angle between the laser beam 12 and the laser-markable surface 22, for example, from about 45° to about 135°. Relative movement between the laser beam 12 and the laser-markable surface 22 of the work piece 21 causes a graphic 23 to be marked in the laser-markable surface 22. The movements and timing of the mirrors 13, 17 and the power of the laser beam 12 are controlled by the numerical control computer 15 to mark the specific desired graphic 23. As referred to herein, relative movement may involve movement of the laser beam 12 (e.g., using the mirror system) as the work piece 21 remains stationary, movement of the work piece 21 while the laser beam 12 remains stationary, or a combination of simultaneous movement of the laser beam 12 and the work piece 21 in different directions and/or at different speeds.

A second computer such as a work station computer (31 in FIG. 3; 26 in FIG. 4) can be used in the method to partition a graphic design into a plurality of graphic design segments and assign the graphic design sections to corresponding components of a multi-component assembly.

According to an implementation, the graphic design to be laser marked in the components may be created using Adobes® Illustrator, or any similar vector based rendering program. Generally, the features that may be etched using vector-based programs include lines and curves that define the outlines of the graphic and its major linear and curved features. The vector-based rendering program AutoCAD® developed by AutoDesk®, Inc. may be employed for this task. In order to make special features such as contour fills that are either difficult or impossible to prepare with AutoCAD®, the additional vector-based program Cutting Shop of Arbor Image Corp. may be used. Cutting Shop is a commercially available product of Arbor Image Corp. promoted for cutting and engraving applications. The raster-based program Technoblast® from Technolines LLC can create computer readable instructions for controlling the laser path and power for marking certain features. The raster- and vector-based program Exodus may be used to rip the files received TechnoBlast® programs into a .tbf graphic (raster) file for the laser controller. Lasers are typically equipped with appropriate software to convert computer files into the laser manufacturer's language.

According to an implementation, a graphic image is scanned or otherwise input into the work station computer, converted into the proper format, e.g., digitized, and digital information corresponding to the lased features of the graphic image is introduced into the control computer with instructions to laser mark graphic design sections into their corresponding elements. The control computer controls movement of the galvanometers 14, 18 and associated mirrors 13, 17 and the power output of the laser 11 to mark the first graphic element on the working surface of the work piece 21 at the appropriate power, movement velocity for high throughput, and beam spot site. At the same time, controllers and the workstation coordinate the relative movement and output of the laser with the article on the support 20. The laser controller will also control transverse movement of the laser beam. The power, beam size, and scan speeds may be selected depending upon the work piece material and intricacy of the graphic design. It may be preferable to avoid undesirable consequences of over-treatment, such as complete carbonization, burn-through and/or melting of the work piece, or under-treatment where the graphic image is not visible or only partially visible. The system can also include a tank 24 to inject a gas such as an inert gas into the working zone for cooling purposes. The amount of gas can be controlled by the work station computer 26, 31, laser controller, or other apparatus.

The work station computer 26, 31 may be, for example, a personal computer system. Computer hardware and software for carrying out the embodiments of the invention described herein may be any kind, e.g., either general purpose, or some specific purpose such as a workstation. The computer may be a Pentium® class or multi-core processor computer, running for example Windows XP®, Windows Vista®, or Linux®, or may be a Macintosh® computer. The computer may also be a handheld computer, such as a PDA, cellphone, or laptop. The programs may be written in C, or Java, Brew or any other programming language. The programs may be resident on a storage medium, e.g., magnetic or optical, of, e.g., the computer hard drive, a removable disk or media such as a memory stick or SD media, or other removable medium. The programs may also be run over a network, for example, with a server or other machine sending signals to one or more local machines, which allows the local machine(s) to carry out the operations described herein.

It should be understood that methods of the present invention may be carried out using various other laser systems having alternative layouts and components to those shown in FIGS. 3 and 4.

Figure 1:
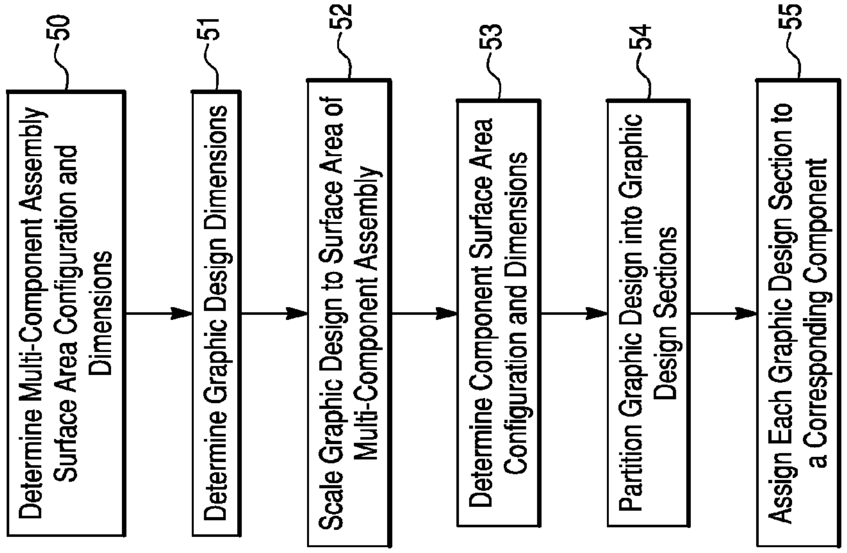
FIG. 1 is a flowchart of an embodiment of a method of laser marking a graphic on a component of a multi-component structure in an unassembled state.
Figure 5:
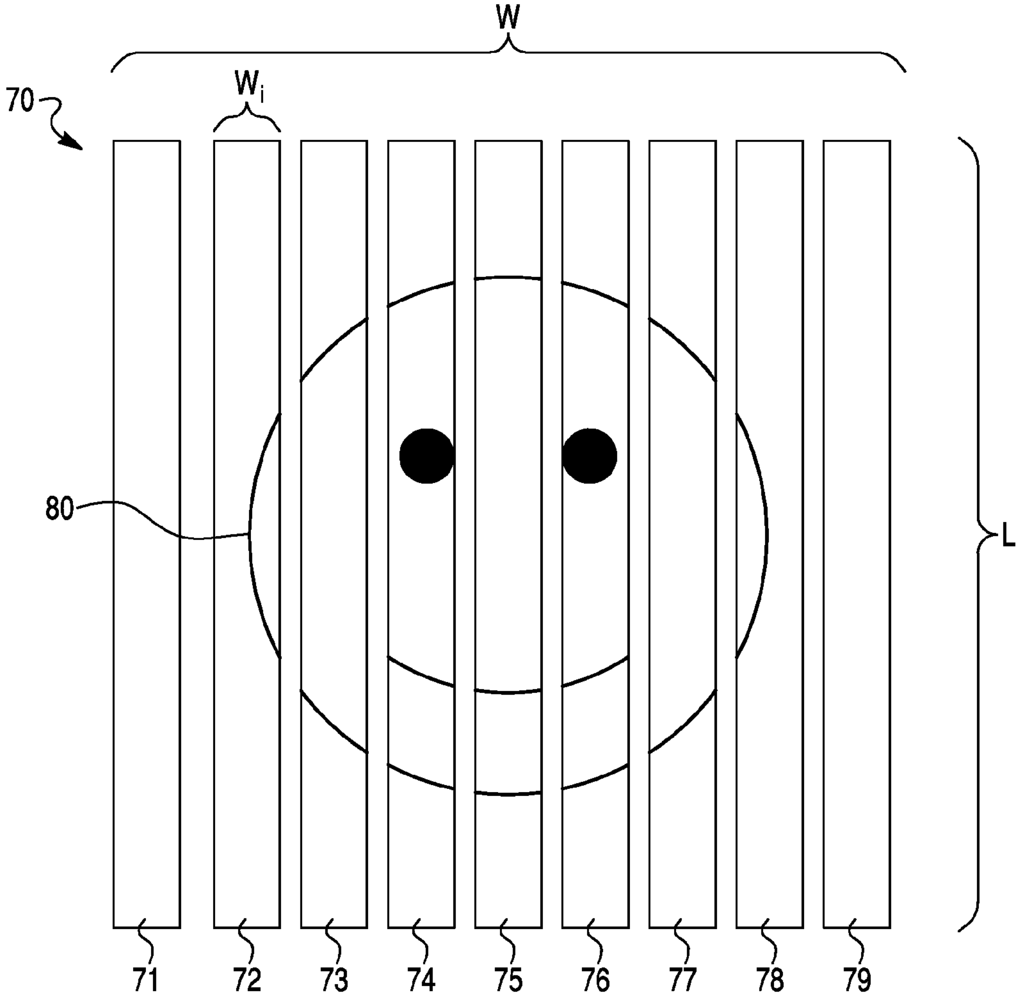
FIG. 5 is an overhead view of a composite floor deck assembled structure having a simple character as a graphic design laser marked into its viewable surface.

Referring now more particularly to the flowchart of FIG. 1, according to an embodiment of the invention the overall surface area configurations and dimensions of a multi-component assembly are determined 50 and input into the work station computer 26, 31. For example, in reference to the particular multi-component structure 70 shown in FIG. 5, the multi-component structure 70 in an assembled state is generally rectangular and has a width W and a length L. The dimensions of the graphic design 80 are also determined 51 and entered into the work station computer 26, 31. The dimensions of the graphic design 80 optionally then may be scaled (increased or decreased) 52 to more closely match the overall dimensions of the multi-component structure 70, e.g., so that the graphic design 80 covers a desired portion of the surface area of the multi-component structure 70. It should be understood that the graphic design 80 does not need to be scaled to span across each and every component defining the viewable area. In FIG. 5, for example, components 71 and 79 are not laser marked with the graphic design 80.

The surface area configuration and dimensions of the components are determined and likewise input into the work station computer 26, 31. The multi-component structure 70 of FIG. 5 is composed of components 71-79 having elongated, rectangular surfaces of identical dimension, i.e., width $W_i$ and length L. The graphic design 80 is partitioned 54 into a plurality of graphic design sections based on the surface area configuration and dimensions of the components 71-79. When assembled, the components form a structure with the graphic design span seemingly continuously across adjacent components, interrupted only by the optional spacing between components. Each graphic design section is assigned to a corresponding component 71-79 of the structure 70 in an unassembled state based on a predetermined designated position of the corresponding component in the multi-component structure.

Where it is predetermined that all of the components 71-79 are identical to one another (except for the design sections lased on the components), as in FIG. 5, the pre-assembly assignment of the graphic design sections to the components 71-79 may be random, i.e., without pre-determination or assignment (prior to laser marking) of the components 71-79 to a particular location in the assembled multi-component structure. In this case, after the components 71-79 of the structure 70 in the unassembled state are laser marked with the design sections, the laser-marked components may be arranged appropriately (depending upon the intended location of their design section relative to the design as a whole) to simulate the overall appearance of the graphic design.

Figure 2:
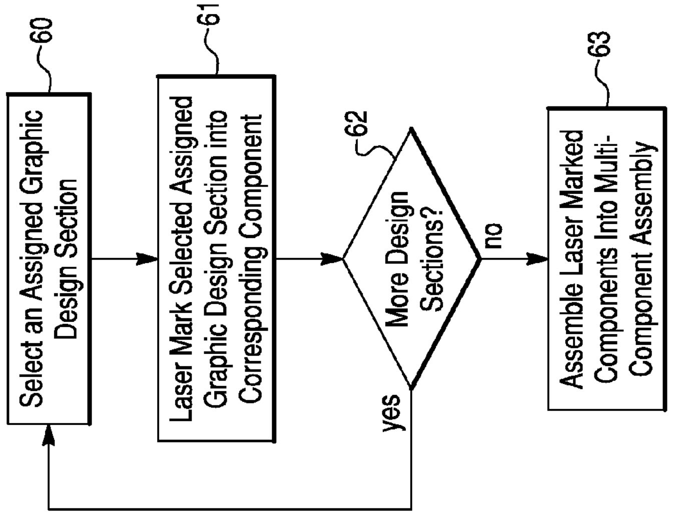
FIG. 2 is a flowchart of an embodiment of laser marking components and assembling the components into the multi-component structure.

FIG. 2 illustrated a flowchart for laser marking in accordance with an embodiment of the invention. An assigned graphic image section is selected 60 together with its corresponding component, and the assigned graphic design section is applied 62 to its corresponding component by laser marking when the component is in its unassembled state. It should be noted that an unassembled state may mean pre-assembled, i.e., prior to assembly of the structure 70, or disassembled, i.e., deconstructing an already constructed structure 70 for laser marking, then optionally reassembling the structure 70. A decision 62 is made as to whether additional graphic design sections require laser marking to their corresponding components. If further graphic design sections require marking, steps 60 and 61 are repeated. After all of the graphic design sections have been laser marked into their corresponding components, the laser-marked components are assembled 63 into a multi-component structure. Assembling 63 may take place at the same or a different locale and at the same or different time than laser marking 61. The laser-marked components may be shipped unassembled as a kit to a remote destination where assembling 63 takes place, for example.

Figure 6:
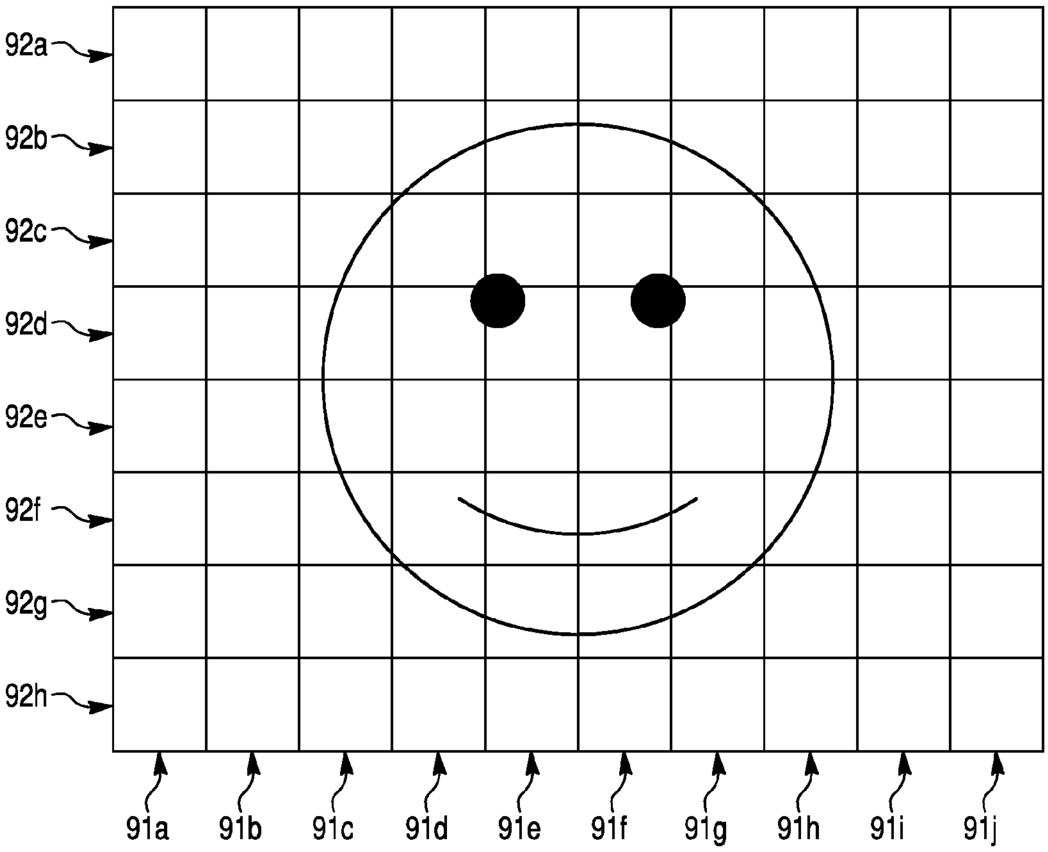
FIG. 6 is an overhead view of another composite floor assembled structure having a simple character as a graphic design laser marked into its viewable surface.

The multi-component structure of FIG. 5 illustrates an array composed of a single row of nine components 71-79, wherein the components are spaced from one another. It should be understood that other multi-component structures and component arrays may be used. For example, FIG. 6 illustrates an embodiment of a multi-component structure composed of an array containing multiple rows 92*a*-92*h* and multiple columns 91*a*-91*j* of components not spaced. Additionally, whereas the assembled components of the multi-component structure of FIG. 5 are spaced from one another, the assembled components of the multi-component structure of FIG. 6 directly contact one another without spacing, that is, are contiguously arranged relative to one another. The graphic design appears to span continuously and without interruption across the contiguous components of the assembled structure.

FIG. 7 shows an implementation in which a logo has been applied to planks of a deck. FIG. 8 shows the assembled deck. The planks may be made of, for example, wood or wood composite, such as a PVC-wood composite material.

From the above description, it will be understood that certain exemplary embodiments of the invention feature the marking of individual component elements of product structures such as decking, railings, and flooring materials (and other products outside the building industry) with design graphics that are made up of individual graphic elements laser engraved or otherwise laser marked in the component in such a way that the graphic pattern is viewable, spanning across adjacent components, when several or all of the components are assembled in a pre-determined arrangement, e.g., an array. The graphic design sections of the marked components may collectively form a cohesive design having the appearance of continuously extending across adjacent components, so that the graphic design sections collectively produce an interconnected and unified aggregate image spanning multiple components of the structure. The aggregate graphic may represent a pattern that is repeating such as a diamond, houndstooth or chevron pattern, for example, or may represent a non-repeating pattern that is organic, floral and/or natural in such a way that it does not repeat. The patterns and graphics may be as simple as geometric designs or highly complex. The inventive concept may permit the laser marking of advanced, highly aesthetic designs to allow manufacturers to offer premium products not now available in the marketplace.

The foregoing detailed description of the certain exemplary embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Although only a few embodiments have been disclosed in detail above, other embodiments are possible and the inventors intend these to be encompassed within this specification and the scope of the appended claims. The specification describes specific examples to accomplish a more general goal that may be accomplished in another way. Modifications and equivalents will be apparent to practitioners skilled in this art and are encompassed within the spirit and scope of the appended claims and their appropriate equivalents. This disclosure is intended to be exemplary, and the claims are intended to cover any modification or alternative which might be predictable to a person having ordinary skill in the art.

Only those claims which use the words "means for" are to be interpreted under 35 USC 112, sixth paragraph. Moreover, no limitations from the specification are to be read into any claims, unless those limitations are expressly included in the claims.

What is claimed is:

1. A method of laser marking a graphic design in an unassembled multi-component structure, the method comprising the steps of:

partitioning a graphic design to be laser marked in a multi-component structure into a plurality of graphic design sections spaced from one another;

assigning each of the graphic design sections to a corresponding component of the multi-component structure based on the overall length and width of the multi-component structure as well as the component width of, component length of, and individual spacing between each corresponding component;

controlling a laser system through a computer in communication with the laser system to coordinate laser marking of the graphic design sections in coordination with the assigned corresponding component; and individually laser marking each of the graphic design sections in the corresponding components while the multi-component structure is in an unassembled state, wherein the laser-marked components are adapted for assembly together with a spacing into an assembled state in which the multi-component structure has a viewable expansive surface with the graphic design sections spaced from each other and collectively simulating an overall appearance of a graphic design spanning across the corresponding components of the multi-component structure; the components comprising building components adapted for construction into a building structure.

2. The method of claim 1, wherein said assigning of each of the graphic design sections to the corresponding components is further based on predetermined designated positions of the corresponding components in the multi-component structure.

3. The method of claim 1, wherein the components comprise a material selected from the group consisting of wood, wood composite, hardboard, and reinforced plastic.

4. The method of claim 1, wherein said laser marking comprises irradiating surfaces of the corresponding components to effect a color change.

5. The method of claim 1, wherein said laser marking comprises irradiating the surfaces of the corresponding components to engrave the graphic design sections into surfaces of the corresponding components.

6. The method of claim 1, wherein the graphic design comprises a non-repeating design.

7. The method of claim 1, wherein the building components include flooring, decking, wall panels, door panels, door trim, siding, cabinetry, and railings for residential and commercial buildings.

8. The method of claim 1, further comprising receiving a graphic design to be laser marked in the multi-component structure and receiving the dimensions of individual components of the multi-component structure.

9. The method of claim 8, further comprising receiving the overall dimensions of the assembled multi-component assembly.

10. The method of claim 9, further comprising resizing the graphic design based on the overall dimensions of the assembled multi-component assembly.

11. The method of claim 1, further comprising receiving a graphic design to be laser marked in the multi-component structure.

12. A method of laser marking a graphic design in components of an unassembled multi-component structure and assembling the components into the multi-component structure, the method comprising the steps of:

partitioning a graphic design to be laser marked in a multi-component structure into a plurality of graphic design sections spaced from one another;

assigning each of the graphic design sections to a corresponding component of the multi-component structure based on the overall length and width of the multi-component structure as well as the component width of, component length of, and individual spacing between each corresponding component;

controlling a laser system through a computer in communication with the laser system to coordinate laser marking of the graphic design sections in coordination with the assigned corresponding component;

individually laser marking each of the graphic design sections in the corresponding components of the multi-component structure while the multi-component structure is in an unassembled state; and assembling the laser-marked components together with a spacing into an assembled state in which the multi-component structure has a viewable expansive surface with the graphic design sections spaced from each other and collectively simulating an overall appearance of a graphic design spanning across the corresponding components of the the multi-component structure comprising a building structure assembled from a plurality of laser-marked building components.

13. The method of claim 12, wherein the assigning of each of the graphic design sections to the corresponding components is further based on predetermined designated positions of the corresponding components in the multi-component structure.

14. The method of claim 12, wherein the components comprise a material selected from the group consisting of wood, wood composite, hardboard, and reinforced plastic.

15. The method of claim 12, wherein said laser marking comprises irradiating surfaces of the corresponding components to effect a color change.

16. The method of claim 12, wherein said laser marking comprises irradiating the surfaces of the corresponding components to engrave the graphic design sections into surfaces of the corresponding components.

17. The method of claim 12, wherein the graphic design comprises a non-repeating design.

18. The method of claim 12, wherein the laser-marked building components include flooring, decking, wall panels, door panels, door trim, siding, cabinetry, and railings for residential and commercial buildings.

19. A method of laser marking a graphic design in an unassembled multi-component structure, the method comprising the steps of:

receiving a graphic design to be laser marked in a multi-component structure composed of individual components that are arranged side-by-side with individual spacing therebetween;

receiving the dimensions of individual components of the multi-component structure and said individual spacing;

determining whether the dimensions of the individual components are identical;

partitioning the graphic design into a plurality of graphic design sections spaced from one another; and randomly laser marking each of the graphic design sections in the individual components while the multi-component structure is in an unassembled state when the dimensions of the individual components are determined to be identical, wherein the laser-marked components are adapted for assembly together with a spacing into an assembled state in which the multi-component structure has a viewable expansive surface with the graphic design sections spaced from each other and collectively simulating an overall appearance of a graphic design spanning across the corresponding components of the multi-component structure taking into account said individual spacing; the individual components comprising building components adapted for construction into a building structure.

20. The method of claim 19, wherein said laser marking comprises irradiating the surfaces of the individual components to engrave the graphic design sections into surfaces of the individual components.

21. The method of claim 19, wherein the building components include flooring, decking, wall panels, door panels, door trim, siding, cabinetry and railings for residential and commercial buildings.

* * * * *